United States Patent [19]  
Dunlap et al.

[11] Patent Number: 4,888,442  
[45] Date of Patent: Dec. 19, 1989

[54] REDUCTION OF FREE MONOMER IN ISOCYANATE ADDUCTS

[75] Inventors: Kenneth L. Dunlap, New Martinsville, W. Va.; Peter H. Markusch, McMurray, Pa.; Clarence D. Ferrell, Moundsville, W. Va.

[73] Assignee: Mobay Corporation, Pittsburgh, Pa.

[21] Appl. No.: 910,579

[22] Filed: Sep. 23, 1986

Related U.S. Application Data

[63] Continuation of Ser. No. 429,910, Sep. 30, 1982, abandoned.

[51] Int. Cl.$^4$ ............................................. C07C 119/00
[52] U.S. Cl. ..................................................... 560/352
[58] Field of Search ............................................ 560/352

[56] References Cited

U.S. PATENT DOCUMENTS

| | | | |
|---|---|---|---|
| 3,903,126 | 9/1975 | Woerner et al. | 260/453 AB |
| 3,919,280 | 11/1975 | Rosenthal et al. | 260/453 P |
| 4,028,392 | 6/1977 | Ogawa et al. | 260/453 |
| 4,385,171 | 5/1983 | Schnabel et al. | 528/491 |
| 4,388,245 | 6/1983 | Ueyanagi et al. | 260/453 AB |

FOREIGN PATENT DOCUMENTS

| | | |
|---|---|---|
| 952931 | 3/1964 | United Kingdom . |
| 981560 | 1/1965 | United Kingdom . |
| 1035142 | 7/1966 | United Kingdom . |
| 1101410 | 1/1968 | United Kingdom . |

*Primary Examiner*—Alan Siegel  
*Attorney, Agent, or Firm*—Joseph C. Gil; Thomas W. Roy

[57] ABSTRACT

The present invention is directed to a process for reducing the free monomer content of polyisocyanate adduct mixtures wherein the adduct has an average isocyanate functionality of greater than about 1.8 which comprises treating the polyisocyanate adduct mixture in the presence of 2 to about 30 percent by weight of an inert solvent, based on the weight of the polyisocyanate mixture, in an agitated thin-layer evaporator under conditions sufficient to reduce the free monomer content of the polyisocyanate adduct mixture below that level which is obtainable in the absence of a solvent.

14 Claims, No Drawings

REDUCTION OF FREE MONOMER IN ISOCYANATE ADDUCTS

This application is a continuation of application Ser. No. 429,910, filed Sept. 30, 1982 now abandoned.

BACKGROUND OF THE INVENTION

1. Field of the Invention

The present invention is directed to a process for reducing the free monomer content in polyisocyanate adduct mixtures prepared from monomeric diisocyanates.

2. Description of the Prior Art

Polyisocyanate adducts are well known in polyurethane chemistry and include isocyanate-terminated prepolymers, biurets, allophanates, isocyanurates and the reaction products of diisocyanates and compounds containing two or more isocyanate-reactive hydrogens. During the production of many of these adducts it is common to use large excesses of the monomeric diisocyanates in order to minimize the formation of high molecular weight products. However, the presence of unreacted monomeric diisocyanates in the final product is undesirable due to the high vapor pressure of the monomeric diisocyanates. Accordingly, after preparation of the adduct mixtures the content of unreacted diisocyanates (free monomers) must be reduced in order to obtain products which have a low vapor pressure.

The initial reduction of the free monomer content is commonly accomplished in conventional distillation apparatus such as a falling film thin-layer evaporator. However, for the final stage of monomer reduction the use of agitated thin-layer or wiped-film evaporators is preferred since they help to maintain uniform temperatures throughout the apparatus. Localized high temperature areas should be avoided to the extent possible in order to minimize the additional reaction of the free monomers with the adducts and to prevent thermal degradation and discoloration. While these conventional distillation procedures can successfully reduce the free monomer content, a need exists for the further removal of these monomers from the polyisocyanate adduct mixture because of the previously discussed effect of their vapor pressure.

It is an object of the present invention to reduce the free monomer content of polyisocyanate adduct mixtures prepared from monomeric diisocyanates.

It is an additional object of this invention to reduce the free monomer content while minimizing discoloration and thermal degradation of the adduct mixtures and also minimizing any substantial further reaction of the free monomers with the polyisocyanate adducts.

It has surprisingly been found that these objects may be accomplished by the present invention which is discussed in more detail below.

SUMMARY OF THE INVENTION

The present invention is directed to a process for reducing the free monomer content of polyisocyanate adduct mixtures wherein the adduct has an average isocyanate functionality of greater than about 1.8 which comprises treating the polyisocyanate adduct mixture in the presence of 2 to about 30 percent by weight of an inert solvent, based on the weight of the polyisocyanate mixture, in an agitated thin-layer evaporator under conditions sufficient to reduce the free monomer content of the polyisocyanate adduct mixture below that level which is obtainable in the absence of a solvent.

DETAILED DESCRIPTION OF THE INVENTION

In the present application the term "polyisocyanate adduct" refers to the adducts having an average isocyanate functionality of greater than about 1.8, preferably greater than about 2.5, and most preferably greater than about 2.8. The term "polyisocyanate adduct mixture" refers to both the adducts and the unreacted diisocyanates (free monomer) remaining after preparation of the adducts.

The polyisocyanate adduct mixtures containing free monomer which are to be treated according to the present invention are prepared from monomeric diisocyanates. Suitable diisocyanates include any organic diisocyanates which, apart from the isocyanate groups, do not contain any other groups that are reactive under the reaction conditions necessary for preparing the polyisocyanate adducts. The diisocyanates may be represented by the formula

$$R(NCO)_2$$

wherein R is an aromatic radical containing 6 to 14 carbons, an aliphatic radical containing 4 to 12 carbon atoms or a cycloaliphatic containing 4 to 15 carbon atoms, the aliphatic or cycloaliphatic radicals optionally being interrupted or substituted by ester groups. It is also possible to use diisocyanates containing both aliphatically- and/or cycloaliphatically-bound isocyanate groups. Suitable diisocyanates include 2,4-diisocyanatotoluene, 2,6-diisocyanatotoluene and mixtures of these isomers; 2,4'-diisocyanatodiphenyl methane, 4,4'-diisocyanatodiphenyl methane and mixtures of these isomers optionally in combination with 2,2'-diisocyanatodiphenyl methane; 1,4-diisocyanatobutane; 1,6-diisocyanatohexane; 2,4,4,-trimethyl-1,6-diisocyanatohexane; 1,11-diisocyanatoundecane, 3-isocyanatomethyl-3,5,5-trimethyl-cyclohexylisocyanate (isophorone diisocyanate or IPDI); 4,4'-diisocyanatodicyclohexyl methane; 1,3-diisocyanato-cyclohexane; 1,2-bis-(isocyanatomethyl)-cyclobutane; and 6-isocyanatocaproic acid-2-isocyanatoethyl ester.

Suitable polyisocyanate adducts include isocyanate-terminated prepolymers, biurets, allophanates, isocyanurates and the reaction products of diisocyanates and compounds containing 2 or more isocyanate reactive hydrogens. The average isocyanate functionality of the polyisocyanate adducts should be greater than about 1.8, preferably greater than about 2.5 and most preferably greater than about 2.8.

Suitable isocyanate-terminated prepolymers may be prepared by reacting the previously mentioned diisocyanates with an isocyanate-reactive component having an average functionality of at least about 1.8, preferably at least about 2, at an NCO/OH equivalent ratio of at least about 1.2:1, preferably about 1.3:1 to 2.2:1 and most preferably 1.3:1 to 2:1. Suitable isocyanate-reactive components have molecular weights of 400 or greater and are set forth in U.S. Pat. No. 4,331,778, incorporated herein by reference, and include polyester polyols, polyether polyols, polythioether polyols, polyacetals and polycarbonates containing hydroxyl groups, polyester amides and polyamides. In addition to these high molecular weight components, the isocyanate-reactive component may also include low molecular weight components having molecular weights of up to about 400. The average molecular weight of the isocyanate-terminated prepolymers may be up to about 10,000, preferably between about 750 and 6000.

While prepolymers prepared from any of the previously mentioned diisocyanates may be treated according to the present invention, this invention is especially useful for treating prepolymers prepared from diisocyanates having high vapor pressures. The present invention is also especially useful for treating prepolymers prepared from diisocyanates wherein the isocyanate groups have similar reactivities, e.g., 1,6-diisocyanatohexane and 4,4'-diisocyanatodicyclohexylmethane. Due to the similar reactivities, the molecular weights of the prepolymers build up to higher levels than would be theoretically predicted, resulting in the presence of free monomers. Accordingly, even when excesses of diisocyanates are not used in preparing the prepolymers, free monomer contents of up to about 20% by weight may be obtained, although usually the free monomer content is less than about 10%.

Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714; 4,220,749 and 4,340,712 by using coreactants such as water, tertiary alcohols, primary and secondary monoamines, and primary and/or secondary diamines. The preferred diisocyanate to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Patent No. 994,890 and German Offenlegungsschrift No. 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift No. 1,150,080; German Offenlegungsschrift No. 2,325,826; and British Patent No. 1,465,812. The preferred diisocyanates to be used are 2,4-diisocyanatotoluene, 2,6-diisocyanatotoluene, mixtures of these isomers, 1,6-diisocyanatohexane, isophorone diisocyanate and mixtures of the latter two diisocyanates.

Polyisocyanate adducts based on the reaction product of the previously mentioned diisocyanates and compounds containing 2 or more isocyanate-reactive hydrogens may be prepared according to the process disclosed in U.S. Pat. No. 3,183,112. In order to prepare polyisocyanate adducts having an average isocyanate functionality of 2.5 or more, it is necessary for the average functionality of the compounds containing isocyanate-reactive hydrogens to have an average functionality of 2.5 or more, e.g., equimolar mixtures of diols and triols can be used to obtain an average isocyanate functionality of 2.5 when reacted with excesses of diisocyanates. Thus, by using compounds containing different amounts of isocyanate-reactive hydrogens or mixtures of these compounds, it is possible to obtain various average isocyanate functionalities. Suitable compounds containing isocyanate-reactive hydrogens have molecular weights of up to 400 and are disclosed in U.S. Pat. No. 3,183,112, incorporated herein by reference, and include ethylene glycol, 1,2- and 1,3-propylene glycol, 1,3- and 1,4-butane diol, 1,6-hexanediol, 2,2-dimethyl-1,3-propylene glycol, glycerine, trimethylol propane, ethylene diamine, diethylene triamine and triethylene tetraamine. 1,3- and 1,4-butane diol, trimethylolpropane and mixtures thereof are preferred. Preferred diisocyanates are 2,4-diisocyanatotoluene, 2,6-diisocyanatotoluene, mixtures of these isomers, 1,6-diisocyanatohexane and isophorone diisocyanate.

The previously described polyisocyanate adducts may be prepared either by using an excess of diisocyanate or, for example, in the preparation of isocyanurates by terminating the reaction prior to complete reaction of the diisocyanates. Regardless, when either of these methods are used, substantial quantities of unreacted diisocyanates remain in admixture with the polyisocyanate adducts following completion of the reaction. Since the content of unreacted diisocyanate in the polyisocyanate adduct mixture may be in excess of 50% by weight, the free monomer content may be initially reduced by treating the adduct mixture in conventional distillation apparatus such as a thin-film evaporator, preferably a falling-film evaporator. Suitable types of conventional distillation apparatus are disclosed in *Chemical Engineering*, pages 160–165, Dec. 9, 1963 and *Chemical Engineering*, pages 135–140, July 22, 1963.

While the previously discussed distillation apparatus may be used for all stages of monomer reduction, it is preferred to initially reduce the monomer content to less than about 20%, preferably less than about 10% by weight, in conventional distillation apparatus such as a falling-film evaporator, and to conduct the final stage(s) of monomer reduction in an evaporator commonly referred to as a wiped-film or agitated thin-film evaporator. These evaporators are discussed in a three-part article entitled, "Agitated Thin-Film Evaporators" from *Chemical Engineering*, Sept. 13, 1965. Obviously, if the initial monomer content is less than about 20%, preferably less than about 10% by weight, as is normally the case with isocyanate-terminated prepolymers, the use of the conventional apparatus may be dispensed with and the entire treatment may be conducted in a wiped-film or agitated thin-film evaporator.

Following the initial distillation treatment in the evaporator, the free monomer content should be less than about 5%, preferably less than about 2% and most preferably less than about 1%, all percentages being based on the total weight of the polyisocyanate adduct mixture. The isocyanate-terminated prepolymers normally do not have free monomer contents which are as high as those of the other polyisocyanate adduct mixtures. Accordingly, they can usually be treated in accordance with the present invention without the need for an initial distillation treatment.

Removal of the unreacted monomeric diisocyanates from the polyisocyanate adduct mixture should be conducted under conditions which avoid quiescence and minimize the time in which any portion of the mixture remains at distillation temperatures. These requirements help to reduce unwanted reactions between the unreacted diisocyanates and the polyisocyanate adducts which lead to higher molecular weight products and also minimize discoloration and thermal degradation. Since these requirements may be met by using wiped-film or agitated thin-layer evaporators, these types of evaporators are preferred for the final stage(s) of monomer reduction or for all stages of monomer reduction if the initial monomer content is within the previously described limits.

The removal of the free monomer in the agitated thin-film evaporator is normally conducted at temperatures above the vaporization temperature of the free monomer at the pressures maintained in the evaporator and below the decomposition temperature of the polyisocyanate adducts. Suitable temperatures range from about 120° to 250° C., preferably greater than about 140° C., while suitable pressures range from about 0.01 to 10, preferably from about 0.05 to 4 mm of Hg.

After the free monomer content of the polyisocyanate adduct mixture has been reduced to the previously discussed levels, the mixture is treated according to the present invention to further reduce the free monomer content by adding a solvent and passing the mixture through an agitated thin-film evaporator. The solvent to be used should be inert to isocyanate groups and one wherein its vaporization temperature is exceeded under the conditions employed in the thin layer evaporator. Preferably, the solvent should have a vaporization temperature which is similar to that of the unreacted diisocyanate.

Suitable solvents are those which are commonly used in polyurethane coating compositions and include esters, ketones, halogenated hydrocarbons, alkanes and arenes. Examples of these solvents are methylene chloride, trichloroethylene, toluene, xylene, butyl acetate, amyl acetate, butyl carbitol acetate, isobutyl acetate, methyl isobutyl ketone, methoxybutyl acetate, cyclohexane, cyclohexanone, dichlorobenzene, diethyl ketone, diisobutyl ketone, dioxane, ethyl acetate, ethyl n-amyl ketone, ethyl n-butyl ketone, ethylene dichloride, ethylene glycol monobutyl ether acetate, ethylene glycol monoethyl ether acetate, ethylene glycol monomethyl ether acetate, 2-ethylhexyl acetate, glycol diacetate, heptane, hexane, isobutyl acetate, isobutyl isobutyrate, isooctane, isopropyl acetate, methyl acetate, methyl chloroform, methyl chloride, methyl ethyl ketone, methyl n-heptyl ketone, methyl isoamyl ketone, methyl n-propyl ketone, mineral spirits, chlorobenzene, 2-nitropropane, trichlorobenzene, perchloroethylene, n-propyl acetate, tetrahydrofuran, tetrachloroethylene, 1,1,1-trichloroethane, trichlorofluoromethane and mixtures of these solvents.

The solvent to be used depends to a degree on the diisocyanate used to prepare the polyisocyanate adduct; however, the preferred solvents are ethylene glycol monoethyl ether acetate, xylene, chlorobenzene and dichlorobenzene. The amount of solvent to be used is dependent upon the content of free monomer in the polyisocyanate mixture. When the free monomer content is less than about 20% by weight, preferably less than about 5% by weight, then up to about 30% by weight solvent, based on the weight of the polyisocyanate adduct mixture, may be added. When the free monomer content is in the more preferred range of less than about 2% by weight, the amount of solvent to be added is 2 to about 20%, preferably about 5 to 15% by weight, based on the weight of the polyisocyanate adduct mixture.

After the solvent has been added to the polyisocyanate adduct mixture, the mixture is treated in the agitated thin-film evaporator under the range of conditions previously discussed. Following this treatment, free monomer contents of less than about 0.7%, preferably less than about 0.4% by weight, may be obtained.

The polyisocyanate adduct mixtures produced in accordance with the present invention are suitable for all of the uses for which these adducts have previously been used. However, due to their low monomer content they are especially suited for spray applications in combination with reactive hydrogen containing materials. The adducts may also be blocked with known blocking agents for isocyanate groups for subsequent use.

The invention is further illustrated, but is not intended to be limited by the following examples in which all parts and percentages are by weight unless otherwise specified.

EXAMPLE 1

An isocyanurate based on 1,6-diisocyanatohexane was prepared in accordance with Example 1 of U.S. Pat. No. 4,324,879 and found to contain 0.27% free monomer. 10% ethylene glycol monoethyl ether acetate was added to this polyisocyanate adduct mixture and this newly formed mixture was treated in an agitated thin-film evaporator (0.07 $m^2$ heat exchange surface) which was maintained at 140° C. and 0.1 mm Hg. The feed rate of the mixture was 0.5 l/hr. The treated adduct mixture was analyzed and found to contain 0.04% free monomer.

EXAMPLE 2

Sufficient 1,6-diisocyanatohexane was added to the treated adduct mixture of Example 1 to raise the free monomer content to 0.63%.

(a) To a first portion of the adduct mixture was added 5% ethylene glycol monoethyl ether acetate. The newly formed mixture was treated in an agitated thin-layer evaporator under the conditions described in Example 1. The treated adduct was analyzed and found to contain 0.16% free monomer.

(b) (Comparison) A second portion of the adduct mixture containing 0.63% free monomer was treated under the conditions described in Example 1; however, no solvent was added to this adduct mixture prior to treatment in the evaporator. The treated adduct mixture was analyzed and found to contain 0.32% free monomer.

EXAMPLE 3

An isocyanurate based on 1,6-diisocyanatohexane was prepared in accordance with Example 1 of U.S. Pat. No. 4,324,879 and found to contain 0.20% free monomer. 10% ethylene glycol monoethyl ether acetate was added to the polyisocyanate adduct mixture and this newly formed mixture was treated in a Luwa agitated thin-layer evaporator (0.13 $m^2$ heat exchange surface) which was maintained at 150° C. and 0.4 mm Hg. The feed rate of the mixture was 0.5 lbs/min. The treated adduct mixture was analyzed and found to contain 0.07% free monomer.

EXAMPLE 4

To DES N 100 (a commercially available biuretcontaining polyisocyanate adduct based on 1,6-diisocyanatohexane and prepared in accordance with U.S. Pat. No. 3,903,127) was added sufficient 1,6-diisocyanatohexane to raise the free monomer content to 0.8%. The polyisocyanate adduct mixture was treated in an agitated thin-layer evaporator under the conditions described in Example 1 using the amounts of solvent set forth in Table I. The amounts of free monomer remaining after the evaporation treatment are also set forth in Table I.

TABLE I

| Solvent | % Free Monomer | |
|---|---|---|
| | Initial | After Treatment |
| no solvent (comparison) | 0.8 | 0.4 |
| 10% o-dichlorobenzene | 0.8 | 0.2 |
| 10% chlorobenzene | 0.8 | 0.3 |
| 10% ethylene glycol monoethyl ether acetate | 0.8 | 0.2 |
| 5% ethylene glycol monoethyl ether acetate | 0.8 | 0.2 |
| 15% ethylene glycol monoethyl ether acetate | 0.8 | 0.3 |

EXAMPLE 5

To DES N 100 was added sufficient 1,6-diisocyanatohexane to raise the free monomer content to 1.3%. The polyisocyanate adduct mixture was treated in a Luwa agitated thin-layer evaporator under the conditions described in Example 3 using the amounts of solvent set forth in Table II. The amounts of free monomer remaining after the evaporation treatment are also set forth in Table II.

TABLE II

| Solvent | % Free Monomer | |
|---|---|---|
| | Initial | After Treatment |
| no solvent (comparison) | 1.3 | 0.6 |
| 10% o-dichlorobenzene | 1.3 | 0.1 |
| 10% ethylene glycol monoethyl ether acetate | 1.3 | 0.2 |

EXAMPLE 6

An isocyanate-terminated prepolymer was prepared by charging the following polyol mix to a reaction vessel:
400 parts of a hexane diol polycarbonate (MW 2000)
100 parts of hydroxymethyl octadecanol, C-19 Henkel Diol (MW 300)
26.7 parts of trimethylolpropane.
The polyol mix was heated to 70° C. until it became clear and then 452.3 parts of 4,4'-diisocyanato-dicyclohexylmethane were added (NCO/OH equivalent ratio 2.07:1). The reaction mixture was gradually heated to between 100°-105° C. and maintained within that temperature range for approximately 5 hours until the NCO content (7.36%) was below theoretical (7.65%). The isocyanate-terminated prepolymer was analyzed and found to contain 11.7% free monomer.

(a) A first portion of this prepolymer was treated in an agitated thin-layer evaporator (0.07 $m^2$ heat exchange surface) which was maintained at 150° C. and 0.1 mm Hg. The feed rate of the mixture was 0.17 l/hr. The treated prepolymer was analyzed and found to contain 7.7% free monomer.

(b) A second portion of the prepolymer was diluted to 90% solids with ethylene glycol monoethyl ether acetate and treated in the agitated thin-layer evaporator used in part (a) under the same conditions and flow rate. The treated prepolymer was analyzed and found to contain 6.3% free monomer.

EXAMPLE 7

An isocyanate-terminated prepolymer was prepared by charging the following polyol mix to a reaction vessel 600 parts of the hexane diol polycarbonate used in Example 6
150 parts of the hydroxymethyl octadecanol used in Example 6
40 parts of trimethylolpropane.
The polyol mix was heated to 65° C. until it became clear and then 678.5 parts of 4,4'-diisocyanatodicyclohexylmethane were added. The reaction mixture was gradually heated to between 100°-105° C. and maintained within that temperature range for approximately 7 hours until the NCO content (7.4%) was below theoretical (7.65%). The isocyanate-terminated prepolymer was analyzed and found to contain 11.3% free monomer.

(a) A first portion of this prepolymer was treated in an agitated thin-layer evaporator (0.07 $m^2$ heat exchange surface) which was maintained at 200° C. and 0.05 mmHg. The feed rate of the mixture was 0.17 l/hr. The treated prepolymer was analyzed and found to contain 5.0% free monomer.

(b) A second portion of the prepolymer was diluted to 90% solids with butyl carbitol acetate (boiling point 240° C.) and treated in the agitated thin-layer evaporator used in part (a) under the same conditions and flow rate. The treated prepolymer was analyzed and found to contain 3.6% free monomer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for reducing the free monomer content of a low molecular weight polyisocyanate adduct mixture wherein the polyisocyanate adduct has an average functionality of greater than about 2.5 which comprises
   (a) treating said polyisocyanate adduct mixture in an agitated thin-layer evaporator under conditions sufficient to reduce the free monomer content to less than about 2 percent by weight, based on the weight of said polyisocyanate adduct mixture,
   (b) adding 2 to about 20 percent by weight of an inert solvent, based on the weight of said polyisocyanate adduct mixture, to said polyisocyanate adduct mixture, and
   (c) treating the mixture formed in step (b) in an agitated thin-layer evaporator under conditions sufficient to reduce the free monomer content of said polyisocyanate adduct mixture.

2. The process of claim 1 wherein said polyisocyanate adduct mixture is formed from a diisocyanate comprising a member selected from the group consisting of 1,6-diisocyanatohexane, isophorone diisocyanate, 1,4-diisocyanatotoluene and 2,6-diisocyanatotoluene.

3. The process of claim 2 wherein said polyisocyanate adduct mixture comprise a polyisocyanate adduct containing isocyanurate rings.

4. The process of claim 2 wherein said polyisocyanate adduct mixture comprise a polyisocyanate adduct containing biuret groups.

5. The process of claim 3 wherein said inert solvent is ethylene glycol monoethyl ether acetate.

6. The process of claim 4 wherein said inert solvent is ethylene glycol monoethyl ether acetate.

7. The process of claim 1 wherein said treatment in an agitated thin-layer evaporator is conducted in the presence of about 5 to 15% by weight of an inert solvent, based on the weight of said polyisocyanate adduct mixture.

8. A process for reducing the free monomer content of a low molecular weight polyisocyanate adduct mixture wherein the polyisocyanate adduct has an average functionality of greater than about 1.8 which comprises
  (a) treating said polyisocyanate adduct mixture in an evaporator under conditions sufficient to reduce the free monomer content to less than about 5% by weight, based on the weight of said polyisocyanate adduct mixture,
  (b) adding 2 to about 30% by weight of an enert solvent, based on the weight of said polyisocyanate adduct mixture, to said polyisocyanate adduct mixture, and
  (c) treating the mixture formed in step (b) in an agitated thin-layer evaporator under conditions sufficient to reduce the free monomer content of said polyisocyanate adduct mixture.

9. The process of claim 8 wherein the evaporator used in step (a) is an agitated thin-layer evaporator.

10. The process of claim 8 wherein step (b) is conducted by adding 2 to about 20% by weight of an enert solvent.

11. The process of claim 8, 9 or 10 wherein said polyisocyanate adduct mixture is formed from a diisocyanate comprising a member selected from the group consisting of 1,6-diisocyantohexane, isophorone diisocyanate, 1,4-diisocyanatotoluene and 2,6-diisocyanatotoluene.

12. The process of claim 11 wherein said polyisocyanate adduct mixture comprises a polyisocyanate adduct containing isocyanurate rings.

13. The process of claim 11 wherein said polyisocyanate adduct mixture comprises a polyisocyanate adduct containing biuret groups.

14. The process of claim 11 wherein said polyisocyanate adduct mixture comprises an isocyanate-terminated prepolymer.

* * * * *